Patented Oct. 22, 1935

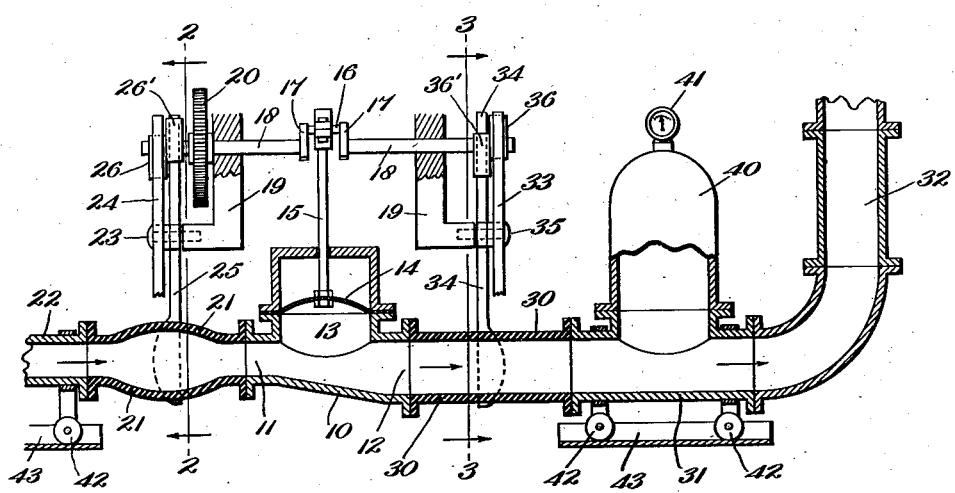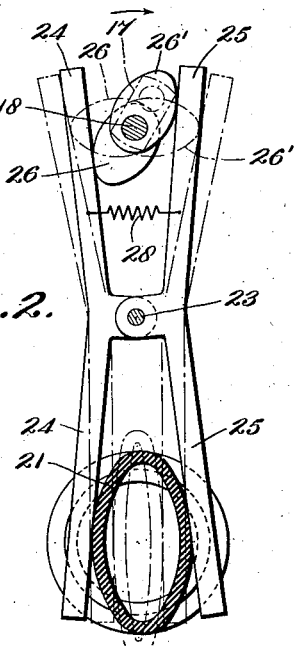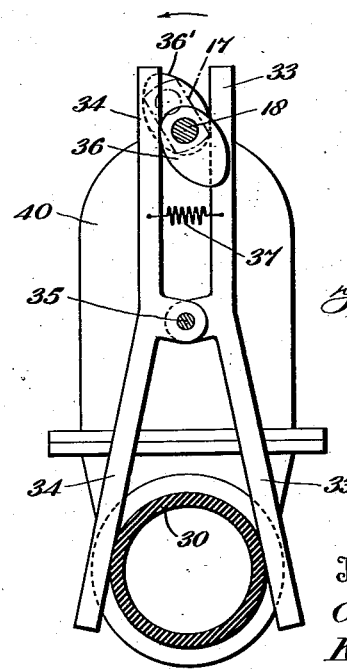

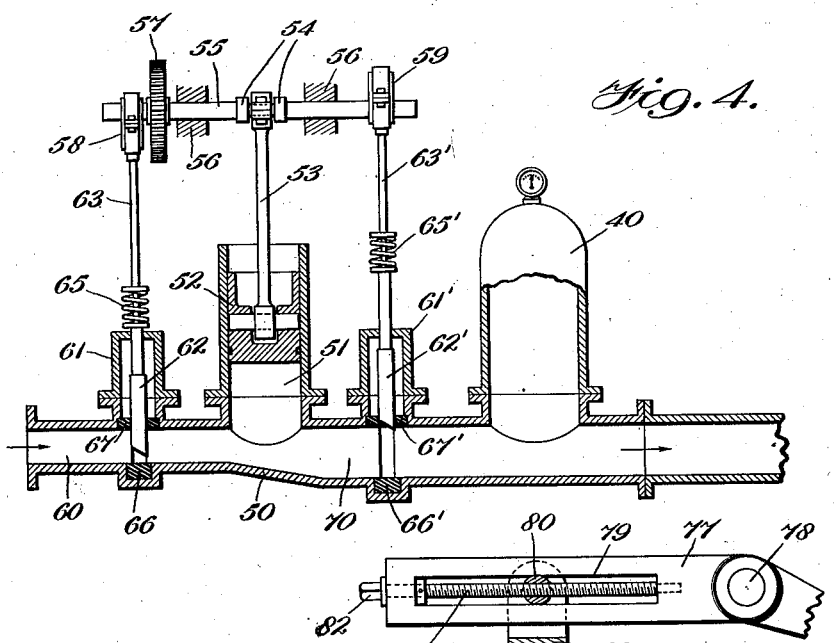

2,017,974

UNITED STATES PATENT OFFICE 2,017,974

METHOD OF AND APPARATUS FOR PUMPING CONCRETE

Otto M. Kästner, Nordeney, Germany, assignor to Jacobus C. Kooyman, The Hague, Netherlands Application January 16, 1933, Serial No. 652,081
In France March 8, 1930

22 Claims. (Cl. 103—153)

The present invention relates to a method of and pumps for handling concrete and other plastic mixtures having physical characteristics similar to concrete in respects hereinafter referred to, and has for one of its objects to provide an apparatus of this character, which by virtue of my invention will effectively and inexpensively handle normal mixtures having a high percentage of coarse aggregate, frequently of large size, and/or of a semi-dry nature, that heretofore have not been pumpable. In short, my object is to provide a method and means by which very-coarse aggregate concrete such as is in wide commercial demand, may be pumped reliably and cheaply, for placement in the structure being built, at lower cost than by any other procedure known to me.

Concrete, as defined by the American Concrete Institute, is "a mixture in which a paste of Portland cement and water binds fine and coarse materials, known as 'aggregates' into a rock-like mass as the paste hardens through the chemical action of the cement and the water". This definition is somewhat more limited than the commonly accepted understanding of the word, which is widely used to designate mixtures in which the fine and/or coarse aggregates are held together by binders other than a cement-and-water paste, such for example, as the well known asphaltic concretes. The term "concrete" is also loosely applied, particularly by laymen, to mixtures of fine aggregate and cement-and-water paste, although technically such mixtures are more properly termed "mortar" or "grout". In the present specification and claims, the word "concrete" is intended to mean a conglommerate mixture of fine and coarse aggregates with a binder, but excluding the fine-aggregate-and-binder "mortars" or "grouts"; and the apparatus and method will be set forth principally with relation to Portland cement concrete, although not strictly limited thereto.

The "aggregates" above referred to are inert materials, which play no part in the chemical reactions between the water and cement which result in the hardening or "setting" of the mixture, and are employed principally to increase the mass and reduce the cost of the product. The larger or "coarser" the largest aggregates used, the cheaper is the concrete, generally speaking. The most commonly used form of fine aggregate is sand, while gravel and crushed rock are the most common forms of coarse aggregate. Any aggregate up to ¼ inch in greatest dimension is considered fine, while coarse aggregates in present commercial use may range from ¼ inch up to 2½ or 3 inches, or even more, in greatest dimension. Aggregates ranging about 2 inches or above I will refer to as "very coarse" for convenience.

Because of its initial plastic nature, hydraulic cement concrete is usually, although not always, introduced into forms of suitable shape, acquiring their configuration, and retaining it after setting. Originally, the placement of plastic mixtures was a hand operation, accomplished with the aid of shovels, wheelbarrows, and wheeled carts or concrete buggies. This method of placement is in use today to a large extent on small structures, but with the advent of plastic mixtures in the building of structures of large magnitude, either in length, area, or height, the so-called "tower" method of placement has come into rather wide use. This method involves the erecting of one or more skeleton towers which serve as an elevator framework, in which elevator cars, usually in the form of receptacles for the concrete mixtures, are raised and lowered by means of a cable and winding drum. Near the top of the tower, the upper end of an inclined chute is secured, the lower end of which is positioned above the form which is to receive the mixture. The concrete is elevated in the tower receptacle and dumped into the upper end of the chute, down which it flows by gravitational action into the form.

A modified "tower" method has also gained rather wide use. In the modified "tower" method, the chute is not used. The concrete is hoisted in the usual manner in the tower and discharged from the tower car into hoppers or receiving receptacles from where it is drawn off into concrete buggies and wheeled manually to the forms to be filled with the mixture. The several tower methods and apparatus, while in rather extensive use, are objectionable from the standpoint of the cost of the tower structure, and its erection and dismantling on each job; also, when using the distributing chute, because of the tendency of the large and heavier aggregate of the concrete mixture, if it be wet enough to flow in the chute under the action of gravity, to segregate from the smaller and lighter constituents, so that the two are deposited separately, with a resultant non-uniform texture in the hardened structure. The apparatus furthermore is not particularly adapted to the handling of dry mixes, unless the chute can be inclined at a relatively steep angle, for otherwise they will not flow therein. In the tower and buggy method, there is necessarily an increased cost as it requires at least one, and in many cases, two men to handle each concrete buggy.

In special cases, requiring the placing of a great quantity of concrete, as in a dam, or in an extensive area, as in buildings and industrial plants, or large sewage settling tanks, belt conveyors, motor trucks, and small narrow gauge railroad cars have been used to transport concrete to the forms.

It has also been proposed to force concrete and mortar mixtures through pipes, both by pneumatic and by mechanical pressure. The pneumatic method has proven too costly for use except in very difficult placement, such as the arch portion of concrete lining for tunnels; the major portion of the concrete in the tunnel lining being placed by other means, and only the top portion of the arch of the lining being placed pneumatically. The fact that pneumatic power is mechanically very inefficient is well known, and too costly for use to any great extent.

Beside the mechanical inefficiency of pneumatic pressure means of placing concrete, there are other draw-backs to this method; e. g. the concrete in many cases is apt to be so wet as to separate in the pipe, with the result that the gaseous pressure blows the lighter constituents (the water, sand and cement) through faster than the coarse aggregates.

The large size of pipe required, as compared to the size of the aggregate (a 6" pipe being recommended for concrete having 1½" size aggregate) also adds to the cost of placing concrete with the pneumatic method.

The pneumatic systems generally discharge only intermittently, as pneumatic pressure must be built up back of the concrete before it can be forced through the pipe. The usual practice is to charge a batch of concrete into the charging tank of the system, which is then tightly closed and the concrete is blown through the pipe, after which the flow of air is stopped, the tank is opened to receive the next batch of concrete, and the operation is repeated. The discharge of concrete from the end of the pipe is difficult to control. Stoppage of the pipe frequently occurs, with the result that excessive pressure is built up within the system, and if it finally overcomes the resistance, the material is shot out in a wholly uncontrollable manner.

It has furthermore been proposed to force grout mixtures, and even concrete in which the coarsest aggregates are quite small, through pipes by means of centrifugal pumps, but up to the present, no commercially practical way of accomplishing this has been devised to the best of my knowledge.

On the other hand, there has been developed in Europe, within the last few years, a pressure pump of the reciprocating piston type which has, within a limited range of "wet" "oversanded" mixes wherein no very coarse aggregates were used, successfully handled concrete, discharging the same in a substantially continuous but pulsating stream. Because of limitations on the possible field of use imposed by the costly nature of such mixes, and because of troubles arising from the pumping method, this practice never became extensive.

These pumps last referred to employ ball check valves, working in valve chambers of much greater size than the balls, which latter are designed to seat tightly during proper portions of each cycle of the piston to prevent back flow. These valves, however, furnish a never-ending source of trouble because of the inherent character of concrete; and while the pumps, as above stated, have been successful in a measure in handling "wet" "over-sanded" mixes,—where the coarse aggregates, with rare exceptions, did not exceed 1¼ to 1½ inches in greatest dimension, and constituted a relatively small percentage of the mixture, under which circumstances they could be considered as "floating" in the sand and cement paste mixture,—they were incapable of handling such mixtures as are most commonly used wherein the coarse aggregate normally exceeds 50% of the constituents of the mix and frequently contains pieces 2½ to 3 inches, or even more, in greatest dimension.

There are several reasons why pumps using ball check valves are severely limited as to the mixes which they are capable of pumping. With the ball type valve—and the same is true of flap valves, mushroom valves, and other types in which the flow of material opens the valve and reverse flow, or gravity, tends to close it—it is necessary to allow sufficient clearance between the movable valve member and the valve housing when open, to permit the largest sized materials to pass. For example, the above mentioned pumps are provided with 90 mm. (3.54") passages or ports, with 110 mm. (4.33") balls controlling them, while the valve chambers, which are tapered, range from 235 mm. (9.20") to 285 mm. (11.25") in diameter. As a result, the net area of the valve chamber is so much greater than that of the port that the concrete tends to "channel"; i. e., it takes the path of least resistance around the obstructing valve member, while the mix in the annulus outside of this zone becomes dormant, hardens, and builds up until the ball can no longer move back and forth to perform its function. This condition is also aggravated by the presence of the guides necessary to center the ball valve.

A normal concrete mixture, which has a large percentage of solid pieces of irregular shape even in the so-called "wet mixes" does not follow the well recognized law of fluids. For example, a liquid or gas flowing through a closed pipe or conduit at a given rate, upon encountering a restriction in such conduit, will increase its velocity at that point in passing the obstruction, whereas a normal concrete mixture, upon encountering a sudden restriction, while passing through a closed conduit, will reduce its velocity and tend to pack or "stow" at such point so as to completely stop the flow.

In valves of the above mentioned type, the movable valve members and the guides therefor, are of necessity positioned in the line of flow and constitute obstructions about which the mixture must be forced. In consequence, the passages through which the concrete is forced must be of a comparatively irregular, locally restricted, and tortuous nature, so much so that the normal mixes (having a high percentage of coarse aggregate, frequently of large size and/or of a semi-dry nature) tend to pack or "stow" in these passages. This "stowing" may suddenly occur in any part of the passages and when it once takes place, the pump soon becomes wholly inoperative.

I have found, and demonstrated, that if the valves are so constructed and arranged as to present in their open positions free and unobstructed passageways for the mixture, and in their "closed" position are only partially closed so as to sufficiently restrict but never completely to cut off said passageways, the mixture will "stow"

or pack at such restrictions, and completely prevent back flow, thereby acting, in a manner of speaking, as part of its own valve-dam. The necessity for completely closing, accurately seating valves, which is one very difficult to meet in pumping concrete, is thus obviated, with the result that most of the valving difficulties heretofore experienced in the prior art pumps above referred to, are eliminated, and the reliability of the pumping is greatly increased.

The passages of such valves may be made of a size sufficient when open, to freely carry a high percentage of coarse aggregate, and also very coarse aggregates, at least up to the maximum in coarseness commonly employed in concrete mixes, as my experience with the pump has shown; and the passage-size may be substantially equal to that of the inlet and outlet passages with which they are in alinement, each valve thus forming, in the open position, a smooth continuation of such passages without pockets or shoulders in or about which the mixture might become dormant, harden, and build up. Thus I overcome very serious utility-limiting objections above noted to the previously developed pump, and take advantage of the packing or "stowing" nature of the concrete so that the restriction of the valved opening need go but a little beyond the point where it will block the very largest pieces of aggregate, to cause prompt and effective pump operation.

The present invention resides principally in my method of and apparatus for pumping concrete mixtures embodying aggregates far coarser than it has heretofore been practicable to pump, (extending at least up to the maximum sizes commonly employed) and of commonly used consistencies, in which the flow passages are partially restricted but purposely are never completely closed, such restrictive actions being in proper timed relation to the working of the pressure member, whereby advantage may be taken of the peculiar (and generally trouble-making) packing or "stowing" property of the mixture to prevent, in conjunction with the restriction, reverse flow of the concrete.

Also the invention consists in the novel details of construction and combinations of parts constituting my apparatus, all as will be more fully hereinafter described, and particularly pointed out in the appended claims.

Referring to the accompanying drawings forming a part of this specification in which like reference characters designate like parts in all the views:—

Figure 1 is a more or less diagrammatic longitudinal sectional elevational view of one form of pump constructed in accordance with the present invention, and capable of carrying out the method involved herein;

Figure 2 is a cross sectional view through the inlet valve of the pump shown in Figure 1, taken approximately on the plane indicated by the line 2—2 of the said figure, looking in the direction of the arrows, the valve operating mechanism being shown in elevation, and the valve being illustrated in its restricted, or "closed" condition;

Figure 3 is a similar view through the outlet valve, taken approximately on the plane indicated by the line 3—3 of Figure 1, looking in the direction of the arrows, the valve being shown in its fully open position;

Figure 4 is a view similar to Figure 1, showing a somewhat modified form of valve construction and valve operating mechanism, applied to a piston pump;

Figure 5 is an elevational view, partly in section, of a further modified form of valve operating mechanism, here shown in connection with the type of valve illustrated in Figure 1, although not necessarily limited thereto; and Figure 6 is an enlarged vertical sectional view, partly in elevation, of the connecting rod and a portion of the rocker arm illustrated in Figure 5.

Referring to Figure 1 there is illustrated more or less diagrammatically a pressure pump construction of the diaphragm type, in which the pump body or housing 10 is provided with an inlet passage 11, an outlet passage 12, and a pressure or working chamber 13, in which is mounted a diaphragm 14. The connecting rod 15 is connected to the said diaphragm at one end while its other end is journalled upon a crank pin 16 joined by crank throws 17 to the crank shaft 18 which is journalled in portions 19 of the pump framework. The crank shaft 18 carries a gear or other power transmitting device 20 which may be driven from any suitable source of power (not shown) to impart rotation to the crank shaft 18, and reciprocation of the connecting rod 15 and diaphragm 14, as will be readily understood.

Connected to the pump housing 10 and communicating with the inlet passage 11 thereof, is a tubular member 21 of rubber or other suitable yielding material, the other end of which communicates with a pipe or conduit 22 leading from a hopper or other source of supply of fresh concrete, not shown.

Pivotally mounted as at 23 upon a portion of the framework 19 is a pair of arms 24 and 25, the upper ends of which engage and are maintained by means of a tension spring 28 in contact with the perimeters of the elliptical cams 26 and 26', which are rigidly carried by the crank shaft 18. The lower ends of the said arms extend downwardly to either side of the resilient tubular member 21 and engage the outer surface thereof as will be clear from Figures 1 and 2. The said tubular member 21 together with the arms 24 and 25, and cams 26 and 26' constitute the inlet valve and the valve actuating mechanism, all as will appear more fully below.

In like manner the outlet passage 12 of the pump housing communicates with one end of a rubber or other resilient tubular member 30, the other end of which is connected to a portion 31 of the discharge pipe or conduit 32. A pair of arms 33 and 34 are journalled as at 35 to a portion of the pump framework 19 and their upper ends engage the perimeters of the elliptical cams 36 and 36', also rigidly carried by the crank shaft 18, see Figures 1 and 3. The lower ends of the said arms extend downwardly and engage the outer periphery of the resilient tubular member 30, and a tension spring 37 is preferably connected to the said arms to normally tend to move them to the position shown in Figure 3. The members 30, 33, 34, 36 and 36' constitute the outlet valve and valve actuating mechanism of the pump, all as will appear more fully below.

The member 31 of the discharge conduit may take the form of a T as shown in Figure 1, which supports an air dome or chamber 40, as is customary in pressure pump practice. The said air dome may be provided with a gauge 41 for indicating the pressure therein.

The cams 26 and 26' are positioned upon the crank shaft 18 at substantially 180° to one another and when they occupy a position such as that illustrated in full lines in Figure 2, wherein the crank 17 is shown as approximately 30° past upper dead center, the upper ends of the arms 24 and 25, will have been forced apart, thereby causing the lower ends of the said arms to be forced toward one another, thus squeezing together the walls of the resilient tubular member 21 associated therewith and producing a partial restriction of the passage therein. The degree of restriction at this point should best be barely sufficient to accomplish the "stowing" of the mixture above referred to, whereby reverse movement of the concrete through passages 11 and 22 will be prevented, although the maximum restriction is not attained until the parts reach substantially the positions shown in broken lines in the said figure, when crank 17 is approximately 90° from dead center. Continued rotation of shaft 18 from this point causes the cams to permit the spring 28 to draw the upper ends of arms 24 and 25 toward one another until the crank reaches lower dead center, at which time the resilient conduit member 21 will have resumed its normal cylindrical shape to permit free and unrestricted passage of the mixture from pipe 22 to working chamber 13 on the up-swing of the crank.

In like manner, the cams 36 and 36' through the arms 33 and 34 associated therewith produce alternate restriction and relief of the resilient section 30 on the outlet side of chamber 13. These cams are so set, of course, as to produce restriction of the member 30 during the up-swing of crank 17, from lower to upper dead center, when member 21 is unrestricted, and vice versa. The concrete is thus permitted to pass out of chamber 13 into conduit 32 on the downward or pressure stroke of diaphragm 14, while reverse movement is prevented due to its "stowing" at the restriction in member 30 on the upward or suction stroke.

It thus results that the members 21 and 30 with their associated parts act in the same manner as the usual inlet and outlet valves of pressure pumps in permitting flow of the concrete in one direction to and from the pressure chamber 13 when they are unrestricted. On the other hand when they are partially restricted, due to the peculiar packing or "stowing" property of the concrete above explained, they will effectively prevent reverse flow of the material, thus acting as check valves, and this notwithstanding the fact that the passages in the members 21 and 30 are never completely closed.

The alternate transverse partial restriction and relief of the members 21 and 30 produces alternate longitudinal contraction and expansion of the same, and in order to compensate for this movement the immediately adjacent portions of the inlet conduit 22 and outlet conduit 32 may be mounted upon rolls such as 42 moving upon fixed trackways 43 whereby the said inlet and outlet conduits may freely move slightly backward and forward in response to the alternate longitudinal expansion and contraction of the members 21 and 30.

In Figure 4 there is illustrated a modified form of valve construction and actuation, as applied to a pressure pump of the piston type. In this figure the pump housing 50 is provided with a working cylinder or chamber 51 in which a piston or plunger 52 is mounted for reciprocation by means of the connecting rod 53 connected to crank 54 of the crank shaft 55, journalled in suitable bearings 56 in the framework of the machine.

The said crank shaft is provided with a gear or other power transmission member 57 by means of which it may be rotated from any suitable source of power, not shown, and the said crank shaft carries the cams or eccentrics 58 and 59 set at an angle of 180° to each other and at approximately 90° to the crank 54. The inlet passage 60 of the pump housing has associated with it a valve housing 61 in which is slidably mounted a damper or gate 62 preferably beveled at its inner end, and connected by means of a valve rod 63 with the eccentric 58. The gate 62 is adapted to be reciprocated partly across the inlet passage 60, being so constructed and arranged, however, that it will never completely close off this passage but will only partially restrict the same, as is illustrated in Figure 4. The valve rod 63 is preferably of a two part construction with a compression spring 65 interposed between the upper and lower sections so that in the event a piece of aggregate of extraordinary size should be positioned beneath the gate 62 as it is moved inwardly, the latter will stop upon engagement with the said piece of aggregate and the spring 65 will be compressed, thereby avoiding the likelihood of breakage or other damage to the valve and its actuating mechanism. If desired a block 66 of resilient material, such for example, as sponge rubber, may be provided below the gate 62, into which pieces of aggregate caught beneath the gate may be forced, to relieve the shock upon the parts and prevent damage thereto. Any pieces of aggregate so forced into the resilient block will of course be returned thereby into the path of the stream of concrete when pressure upon the valve 62 is released and will be moved onwardly as the flow proceeds. Suitable packing 67 may be provided around the gate 62 to prevent entry of the concrete material into the interior of the valve housing 61, as will be readily understood.

The outlet valve associated with the outlet passage 70 of the pump may be of precisely similar construction to that just described in connection with the inlet valve, and the corresponding parts thereof have therefore here been designated by primes of the corresponding reference numerals.

In Figures 5 and 6 there is shown a further modified form of valve actuating mechanism, which has been here illustrated in connection with the resilient tube type of valve shown in Figure 1, although not necessarily limited thereto. In this form of construction provision is made for adjustment of the stroke of the valve rod whereby the amount of restriction of the valve passages may be varied in accordance with the size of the aggregate being employed, provision also being made herein for adjustment of the valve timing, which is made necessary by the changing of the length of stroke of the valve rod.

Referring more particularly to Figure 5 the crank shaft 18 of the pump is provided with cam 75 which is or may be of substantially the shape shown therein, well adapted for maintaining the restriction for the desired portion of the pump cycle and then permitting quick opening of the valve-passage, and the periphery of which is engaged by a roller 76 carried by one end of a rocker arm 77 which is pivotally mounted as at 78 upon a portion of the framework, not shown. The other end of the rocker arm 77 is preferably slotted as at 79 to slidably accommodate a stud or pin 80, through which is threaded a screw 81 terminating in an exterior head 82 to which a wrench may be applied for rotating the screw.

whereby the position of the pin 80 relative to the pivot 78 may be varied, as will be readily understood.

The pin or stud 80 pivotally mounts a yoke 83 having rigid therewith a threaded rod 84 which is received in one end of a sleeve 85, the other end of which receives the threaded end of a rod 86. The threads upon the rods 84 and 86 are pitched in opposite directions so that in connection with the sleeve 85 there is provided a turnbuckle construction whereby the length of the valve rod may be varied through rotation of the sleeve 85, as will be readily understood. Lock nuts 87 may be provided above and below the sleeve 85 in order to rigidly maintain the parts in any position to which they may be adjusted.

The lower end of the rod 86 is provided with a head 88 and is received within the bore 89 of a tubular housing 90, the lower end of which has a rod 91 threaded therein, which rod terminates in an eye 92. A helical spring 93 surrounds the lower end of rod 86 within the bore 89 of housing 90 with its lower end resting upon the head 88 and its upper end abutting against the inner surface of a cap member 94 which may be threaded upon the housing 90, as clearly shown in Figure 6. The lock nut 95 is preferably provided to maintain the parts in any adjusted relationship.

The eye 92 of rod 91 is connected by a pin 96 to one end of an arm 97, the other end of which is rigid with a shaft 98 journalled in a housing 99, which may be mounted upon the pump framework. The said housing is provided with guideways 100 in which are slidably mounted a pair of inverted L-shaped jaws 101 and 102 which are arranged in spaced relationship to receive the resilient tubular valve member such as 21 of the pump. The said jaws 101 and 102 are disposed at opposite sides of a gear 103 carried by the shaft 98 within the housing 99, and the said jaws are respectively provided with rack teeth 104 and 105 meshing with the teeth of the said gear, as will be clear from Figure 5. Being arranged at opposite sides of the gear, rotation of the latter in either direction will result in movement of the respective jaws in opposite directions so that the tubular member such as 21 may be alternately pressed to partially restrict the same, as indicated by broken lines in Figure 5, and released to resume its normal circular shape as indicated in full lines in the said figure, all as will be readily understood.

In the normal operation of pumps embodying valves of either of the types herein shown the parts are preferably so constructed and arranged that when the valves are in their most restricted condition they will still leave passages of sufficient size to accommodate the average maximum size of the largest aggregates being employed in the concrete mixture. In this way the valves will ordinarily not contact with the large aggregate in such a way as to tend to crush the same or to cause damage to the mechanism. On the other hand should an "oversized" piece of aggregate, larger than average maximum, be present in the valve at the time the latter is closing, the springs such as 65 in Figure 5 and 93 in Figure 6 will be compressed, and thus obviate any danger to the mechanism. Mixes having a high degree of stowing tendency, e. g. dry or small slump mixes, and mixes deficient in sand or deficient in fine particles of sand, may call for adjustment of this opening somewhat larger than the general rule stated above.

Should the average size of the large aggregate be increased, the minimum opening through the valve when in its most restricted position should also be preferably be increased in order to eliminate necessity for continual compensation by the springs such as 65 and 93. In the form of the invention illustrated in Figures 5 and 6 this may be accomplished through adjustment of the position of stud 80 relative to the pivot 78 by means of the adjustment screw 81. That is to say, if the screw 81 be rotated so as to move the stud 80 toward the right, as viewed in Figure 5, to a position closer to the pivot 78, the length of the stroke of the valve rod assembly would naturally be shortened since, while the arcuate travel of the rocker arm 77 will remain the same, the linear travel imparted to the valve rod assembly 84, 86, 91 etc. by the stud 80 will decrease as its distance from the pivot 78 is decreased. Such decrease in the length of the stroke of the valve rod assembly, assuming that it starts with the resilient member 21 fully expanded to its normal circular condition will result in less restriction thereof so that the valve may accommodate larger aggregates without the necessity of calling upon the spring such as 93 to accommodate them. In like manner a shifting of the position of the stud 80 toward the left as viewed in Figure 5 to increase the length of the stroke of the valve rod assembly will have the effect of increasing the restriction of the resilient tubular member 21, which will be preferable in case the average size of the coarse aggregate is decreased.

Such shifting of the position of the stud 80 relative to the pivot 78 will also have the effect of changing the timing of the valve, in that it will change the time at which the valve rod assembly begins the restriction of the member 21, relative to the movement of the piston 52 or diaphragm 14. In order to compensate for this so as to always begin the restriction of the member 21 at the same time relative to the diaphragm or piston stroke it will be necessary to lengthen or shorten, as the case may be, the over all length of the valve rod assembly, which adjustment is accomplished through a turning of the sleeve 85 in the proper direction as will be readily understood. The proper timing of the valve relative to the movements of the pressure member may thus be preserved, notwithstanding that the length of the stroke of the valve rod assembly may be changed in order to accommodate coarse aggregates of different sizes.

In operation of my piston pump having a valve mechanism constructed and arranged as in Figure 5, under conditions making no attempt at maximum performance record, I have easily and reliably handled concrete mixtures of 1:2:4 and mixtures having even a higher percentage of coarse aggregates, embodying large aggregates of an average maximum size of 65 mm., with the water content sufficient to give a slump of some 100 to 200 mm. in 300 mm. (approximately 4 to 8 inches in 12 inches), which, to the best of my knowledge, amounts to performance unapproached hitherto in character of concrete handled and satisfactory freedom from trouble in hour-after-hour performance.

This application is a continuation in part of my prior co-pending application filed March 3, 1931, Serial No. 519,763, entitled Pump for raising or conveying concrete and the like substances.

It is obvious that those skilled in the art may vary the details of construction and arrangement of parts constituting the apparatus, as well as the precise steps and combinations of steps constituting the method as herein described without departing from the spirit of the invention, and therefore it is not wished to be limited to details of the above disclosure, except as may be required by the claims.

What I claim is:

1. In a pump for handling concrete mixtures, having a working chamber, a pressure member working in said chamber, and a material passage communicating with said chamber, the combination of a valve arranged to alternately partially restrict but never completely close said passage and to remove said restriction, in timed relation to the movements of said pressure member, whereby flow of the material, which may freely occur when the passage is unrestricted, may be prevented when it is restricted, through stowing of the material at the restriction.

2. In pumping apparatus for forcing plastic concrete mixtures through a conduit, said mixtures embodying substantial proportions of coarse aggregate which impart thereto a strong tendency to stow, the combination of a pump device connected to said conduit, having means arranged to impart movement to the mixture in the conduit through intermittent applications of pressure thereto; and a device in the line of flow, beyond said pressure-inducing means, arranged to provide freedom from stowage-inducing restriction of cross-sectional area in the conduit during said pressure application, and to provide stowage-inducing partial restriction of the conduit between said pressure applications, to prevent movement of said mixture.

3. In a pump for handling concrete mixtures, having a working chamber, a pressure member working in said chamber, and inlet and outlet passages communicating with said chamber, the combination of valves for alternately partially but not completely restricting said inlet and outlet passages in timed relation to the movements of said pressure member, whereby reverse flow of the material through said passages may be prevented through stowing of the material at the restrictions.

4. In a pump for handling concrete mixtures, having a working chamber, a pressure member working in said chamber, and inlet and outlet passages communicating with said chamber, the combination of valves in said inlet and outlet passages, said valves in their open positions providing smooth unobstructed passages of substantially the same cross sectional area as said inlet and outlet passages; and means for alternately positively partially closing said valves in timed relation to the movements of said pressure member to partially but never completely restrict said valve passages, whereby reverse flow of the material through said passages may be prevented through stowing of the material at the restrictions.

5. In a pump for handling concrete mixtures, having a working chamber, and a pressure member working in said chamber, inlet and outlet passages having collapsible tubular portions communicating with said chamber; and means for alternately compressing the inlet and outlet tubular portions in timed relation to the movements of said pressure member, said compressing means being arranged to partially but never completely collapse said tubular portions, whereby reverse flow of the material through said passages may be prevented through stowing of the material at the constrictions.

6. In a pump for handling concrete mixtures, having a working chamber, a pressure member working in said chamber, and inlet and outlet passages communicating with said chamber, the combination of a gate slidable transversely of each of said passages; and cam means for alternately sliding the gates of the inlet and outlet passages, in timed relation with the movements of said pressure member, to and from positions partially, but never completely restricting their respective passages, whereby reverse flow of the material through said passages may be prevented through stowing of the material at the restriction.

7. In a pump for handling concrete mixtures, having a working chamber provided with inlet and outlet passages, a pressure member working in said chamber, and driving means for said pressure member, collapsible tubular members communicating with said inlet and outlet passages; jaws engaging opposite sides of each collapsible member, the jaws of each set being provided with racks; a pinion meshing with the racks of each set of jaws; cams operated by said driving means; and lever and link connections between said cams and pinions to oscillate the latter, and thereby open and close said jaws in timed relation to the movements of said pressure member and to alternately partially but never completely collapse said tubuar members.

8. In a pump for handling concrete mixtures, having a working chamber, a pressure member working in said chamber, a material passage having a transversely collapsible portion communicating with said chamber, and means for partially collapsing and releasing said portion in timed relation to the movements of said pressure member, the combination of means arranged to accommodate the longitudinal movements of portions of said passage resulting from the transverse collapse and release of said collapsible portion.

9. The method of moving concrete mixtures which comprises creating varying pressure conditions within a confined space to impart movement to the mass through a passage communicating with said space; partially restricting said passage during the existence of one of said pressure conditions, whereby movement of the mass in the passage is prevented through stowing of the mass at the restriction; and removing the restriction during the existence of another pressure condition, to permit free movement of the mass in said passage.

10. The method of moving concrete mixtures embodying substantial proportions of large aggregate, which comprises creating varying pressure conditions within a confined space to impart movement to the mass through a passage communicating with said space; partially restricting said passage during the existence of one of said pressure conditions to substantially the average size of the large pieces of said large aggregate, whereby movement of the mass in the passage is prevented through stowing of the mass at the restriction; and removing the restriction during the existence of another pressure condition to permit free movement of the mass in said passage.

11. The method of moving concrete mixtures which comprises creating alternate negative and positive pressures within a confined space to impart movement to the mass to and from said space; and alternately partially but never completely restricting the passages through which the mass is moving to and from said space, in timed relation to the changes in pressure therein, whereby movement of the mass in the passages in one direction is prevented through stowing of the mass at the restrictions.

12. In the method of moving a plastic concrete mixture through a passage communicating with a pressure chamber, said mixture embodying a substantial proportion of coarse aggregate which imparts thereto an inherent tendency to stow, the steps which comprise imparting movement to said mixture through the application of pressure thereto; conducting the mixture through said passage free from stowage-inducing restrictions therein during said pressure application; and providing stowage-inducing partial restriction in said passage to prevent movement of the mixture upon cessation of said pressure application.

13. The steps in the method of moving plastic concrete mixtures through a passage leading from a pressure chamber by means of pressure exerted upon the mixtures in said chamber, said mixtures embodying substantial proportions of coarse aggregate which imparts thereto a strong tendency to stow, which steps comprise conducting said mixture from said chamber through said passage free from obstructions and restrictions which will produce said stowing action; and providing partial but not complete obstruction or restriction of the mixture in said passage to produce stowing of the mixture and prevent reverse movement thereof toward said chamber.

14. In a pump for handling concrete mixtures, having a working chamber, a pressure member working therein, and a material passage communicating with said chamber, the combination of means arranged to alternately partially restrict said passage and to remove said restriction, in timed relation to the movements of said pressure member, whereby flow of the material, which may freely occur when the passage is unrestricted, may be prevented when it is restricted, through stowing of the material at the restriction; and means arranged to vary and positively determine the degree of such restriction, to accommodate the pump to mixtures embodying constituents of different sizes.

15. In a pump for handling concrete mixtures, having a working chamber, a pressure member working therein, and a material passage communicating with said chamber, the combination of means arranged to alternately partially restrict said passage and to remove said restriction, in timed relation to the movements of said pressure member, whereby flow of the material, which may occur freely when the passage is unrestricted, may be prevented when it is restricted, through stowing of the material at the restriction; means arranged to vary and positively determine the degree of such restriction, to accommodate the pump to mixtures embodying constituents of different sizes; and means for compensating for the changes in the relation of the movements of said restricting means to those of the pressure member, resulting from changes in the degree of restriction.

16. In a pump for handling concrete mixtures, having a working chamber, a pressure member working therein, and a material passage communicating with said chamber, the combination of means including a valve rod arranged to alternately partially restrict said passage and to remove said restriction, in timed relation to the movements of said pressure member, whereby the flow of the material, which may freely occur when the passage is unrestricted, may be prevented when it is restricted, through stowing of the material at the restriction; and means arranged to vary the stroke of said valve rod and thereby control the degree of such restriction, to accommodate the pump to mixtures embodying constituents of different sizes.

17. In a pump for handling concrete mixtures, having a working chamber, a pressure member working therein, and a material passage communicating with said chamber, the combination of means including a valve rod arranged to alternately partially restrict said passage and to remove said restriction, in timed relation to the movements of said pressure member, whereby flow of the material, which may freely occur when the passage is unrestricted, may be prevented when it is restricted, through stowing of the material at the restriction; means arranged to vary the stroke of said valve rod and thereby control the degree of such restriction, to accommodate the pump to mixtures embodying constituents of different sizes; and means for varying the length of said rod to compensate for changes in the relation of the movements thereof to those of said pressure member, resulting from said variations in the stroke of the rod.

18. In a pump for handling concrete mixtures, having a working chamber, a pressure member working therein, and a material passage communicating with said chamber, the combination of means including a cam, a pivoted rocker arm actuated thereby, and a valve rod slidably connected to said rocker arm arranged to alternately partially restrict said passage and to remove said restriction, in timed relation to the movements of said pressure member, whereby flow of the material, which may freely occur when the passage is unrestricted, may be prevented when it is restricted, through stowing of the material at the restriction; and means for shifting the connection between the valve rod and rocker arm relative to the pivot of the latter to vary the stroke of the former and thereby control the degree of said restriction, and thus accommodate the pump to mixtures embodying constituents of different sizes.

19. In a pump for handling concrete mixtures, having a working chamber, a pressure member working therein, and a material passage communicating with said chamber, the combination of means including a cam, a pivoted rocker arm actuated thereby, and a two part valve rod slidably connected to said rocker arm, arranged to alternately partially restrict said passage and to remove said restriction, in timed relation to the movements of said pressure member, whereby flow of the material, which may freely occur when the passage is unrestricted, may be prevented when it is restricted, through stowing of the material at the restriction; means for shifting the connection between the valve rod and rocker arm relative to the pivot of the latter to vary the stroke of the former and thereby control the degree of said restriction, and thus accommodate the pump to mixtures embodying constituents of different sizes; and a connection between the two parts of said valve rod arranged to vary its length to compensate for changes in the relation of the movements thereof to those of said pressure member, resulting from said shifting of the connection between said valve rod and rocker arm.

20. In the method of moving plastic concrete mixtures embodying substantial proportions of coarse aggregates in confined streams by intermittent impulses imparted to successive confined portions of the mixture, the step of controlling such movement which comprises temporarily partially but not completely restricting the flow of the mixture to produce stowing thereof at the restriction, whereby movement is prevented in synchronism with the impulses.

21. In the method of moving plastic concrete mixtures in confined streams by intermittent impulses imparted to successive confined portions of the mixture, said mixture embodying substantial proportions of coarse aggregates which give thereto a strong tendency to stow, the step of controlling such movement which comprises alternately restricting the streams to approximately the average dimension of the coarse aggregate to produce stowing of the mixture at the restriction, whereby movement is prevented, and relieving the restriction to restore the flow.

22. The method of controlling the movement under pressure of a confined stream of plastic concrete mixture embodying substantial proportions of coarse aggregates which give to such mixture a strong tendency to stow, which comprises relatively abruptly partially reducing the cross sectional area of the stream to produce the stowing action, at such times as complete stoppage of the flow is desired.

OTTO M. KÄSTNER.